United States Patent [19]

Kodl

[11] Patent Number: 4,963,693
[45] Date of Patent: Oct. 16, 1990

[54] PURGE ENCLOSURE FOR ELECTRICAL EQUIPMENT IN HAZARDOUS LOCATION

[75] Inventor: David A. Kodl, Auburn, Ala.

[73] Assignee: Ampex Corporation, Redwood City, Calif.

[21] Appl. No.: 402,095

[22] Filed: Sep. 1, 1989

[51] Int. Cl.$^5$ .............................................. H05K 5/00
[52] U.S. Cl. .................................... 174/11 R; 73/461; 116/270; 116/DIG. 8; 174/17 GF; 206/213.1; 206/305; 206/328; 312/1; 324/156; 383/106
[58] Field of Search ................. 174/11 R, 12 R, 17 R, 174/17 GF; 73/431; 116/270, DIG. 8, DIG. 9; 150/154, 165; 206/213.1, 305, 328; 235/1 D; 312/1; 324/156; 383/106, 127

[56] References Cited

U.S. PATENT DOCUMENTS

| | | | |
|---|---|---|---|
| 1,119,986 | 12/1914 | Pleger et al. | 206/213.1 X |
| 2,786,740 | 3/1957 | Taylor et al. | 312/1 |
| 3,415,582 | 12/1968 | Trexler | 312/1 |
| 3,665,991 | 5/1972 | Gillemot et al. | 383/106 X |
| 4,729,337 | 3/1988 | Schopp | 116/270 X |

Primary Examiner—Laramie E. Askin
Attorney, Agent, or Firm—Douglas M. Gilbert; Harry G. Thibault

[57] ABSTRACT

A protective or purge enclosure provides a positive atmosphere around an operating device such as a handheld computer or calculator contained therein. The protective enclosure has sufficient flexibility, even though providing a positive, sealed atmosphere, to enable the user to operate the functional features of the device sealed within the enclosure, and the material forming the device is sufficiently transparent to enable the user to view the functional features of the device for operation. A visible indicator provided on the enclosure enables the user to determine if the enclosure is maintaining the positive atmosphere sealed therein.

4 Claims, 1 Drawing Sheet

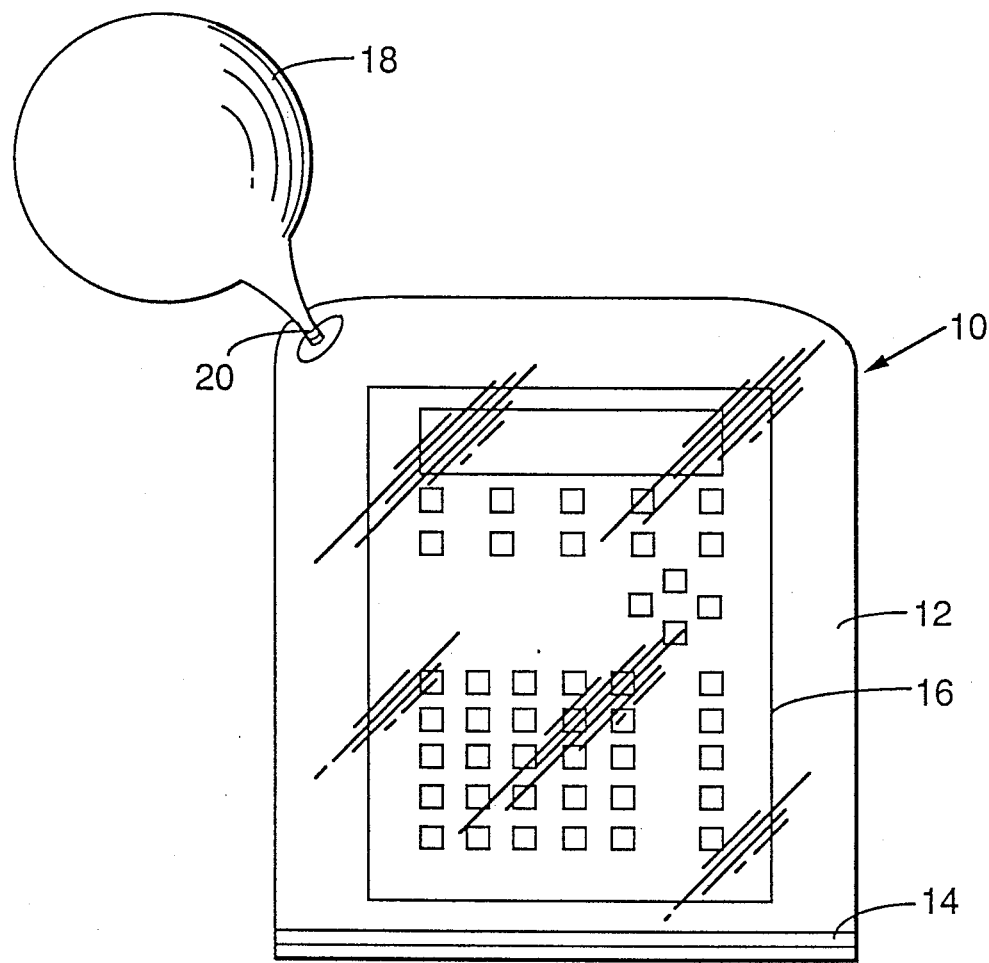

PURGE ENCLOSURE FOR ELECTRICAL EQUIPMENT IN HAZARDOUS LOCATION

The present invention relates generally to protective enclosures and particularly to a protective enclosure for use in a hazardous environment.

BACKGROUND OF THE INVENTION

There is a wide variety of protective enclosures in the marketplace. For example, it may be desirable to isolate the user from certain corrosive chemicals which he may have need to use. In such instance it is desirable to place a protective material surrounding those chemicals. In other cases it may be desirable to isolate the user from radioactive or toxic chemicals and a suitable enclosure is thus provided. Another type of enclosure available in the art is a protective or resilient type of enclosure surrounding a sensitive mechanism which can be easily damaged if dropped or roughly handled. The enclosure of the present invention differs from each of such devices and yet incorporates certain of the features noted above.

In the workplace the worker may be surrounded by atmospheric conditions conducive to danger. For example, an oxygen rich atmosphere might be particularly conducive to flash fire caused by a stray spark. A similar condition could exist in a dust laden atmosphere or in an atmosphere which includes flammable vapors.

In such hazardous environment, the worker may be required to operate such electrical equipment as meters, hand-held computers, calculators or the like. In such an environment, a stray spark can have calamitous consequences. Accordingly, it is desirable to enclose such meters or calculators within a protective enclosure which prevents such stray spark from igniting the atmosphere outside the protective enclosure. Therefore the protective enclosure must maintain a positive atmosphere around the enclosed device to prevent the outside atmosphere from leaking into the enclosure. The positive atmosphere can be said to purge the outside atmosphere from the enclosure. Moreover the protective or purge enclosure must provide means for monitoring the presence of a positive atmosphere within such protective enclosure. Moreover the positive atmosphere provided in the protective enclosure must not be so high as to restrict the operator in his use of the functions associated with the operating device enclosed therein, and/or the material used to form the enclosure must be sufficiently flexible to enable the user to operate the device contained within the enclosure without the loss of the positive atmosphere provided within such enclosure. Moreover the protective enclosure should include a positive visual indication that there is a positive atmosphere present in the protective enclosure. And the protective enclosure must be transparent to enable the user to see the device enclosed therein to effectively operate it. And the protective enclosure must be sealable to retain the positive atmosphere provided therein. And it is an important feature of the present invention that the protective enclosure be portable; that is, not joined to a hard line piping the protective atmosphere into the enclosure, and of lightweight construction, enabling the user to easily move the protective enclosure and the hand-held device encapsulated therein from location to location within the user's environment.

SUMMARY OF THE INVENTION

Accordingly, the present invention provides a protective enclosure which is sealable and capable of holding therein a positive atmosphere, said enclosure formed of a transparent material and including a visible indicator to indicate the presence of a positive atmosphere therein, such enclosure having sufficient resilience to permit the operation of any meter or calculator or like device stored therein.

A more complete understanding of the present invention can be obtained through a consideration of the detailed description thereof as well as a consideration of the drawing which accompanies that description, said drawing briefly described below.

BRIEF DESCRIPTION OF DRAWING

The drawing is a front perspective view of the purge enclosure of the present invention including all of the salient features thereof and showing a hand-held calculator in place therein.

DETAILED DESCRIPTION

The protective or purge enclosure 10 of the present invention includes a flexible, transparent, sealable bag 12 having a suitable resealable closure device 14 for sealing the bag 12, for enabling the insertion of a device 16 into the bag 12 as well as its subsequent removal.

The bag 12 is formed of a flexible transparent material such as polyurethane, and is designed to contain a hand-held device 16, such as a small computer or calculator 16. Other forms of devices, such as meters, could be sealed in the protective enclosure 10, and the form of the device discussed hereinafter is intended to be illustrative and not limiting. The bag 12 is sealable to retain a separate atmosphere in the bag 12 such as air or perhaps an inert gas, such atmosphere to be a positive atmosphere, that is, somewhat more than atmospheric pressure so as to prevent the outside atmosphere from entering the bag 12.

Additionally, the material forming the bag 12 must have sufficient resilience to provide enough flexibility in the bag 12 to enable the user to operate the functional switches associated with the calculator 16 contained therein. The bag 12 must be durable, such that repeated use of the calculator 16 contained therein will not affect the ability of the bag 12 to maintain its positive atmosphere, and the repeated use of the device 16 contained there will not noticeably affect the flexibility of the bag 12. Moreover, the balance between the flexibility present in the material forming the bag 12 and the level of the positive atmosphere therein is important. The most flexible of materials would not provide a suitable enclosure if the protective atmosphere sealed therein is maintained at a level that is high enough to prevent the user from operating the device 16 contained therein.

The enclosure 10 also includes an indicator 18 to indicate the presence of a separate, positive atmosphere within the bag 12, the indicator 18 taking the form of a balloon or similar device 18 with a suitable straight through connector 20 provided between the bag 12 and the indicator 18 so as to provide in the indicator 18 the same atmosphere as is in the bag 12. In the preferred embodiment of the present invention, the positive atmosphere in the bag 12 is introduced into the bag 12 through the connector 20. If desired, a second valve could be provided in the bag 12 remote from the connector 20, with such second valve providing the means for introducing the positive atmosphere into the bag 12, with the connector 20 simply serving as a conduit between the bag 12 and the indicator 18. In a hazardous environment, the connector 20 must be a straight through connection so as to always provide the user with an indication of the level of the positive atmosphere in the sealed bag 12. In use, the loss of atmosphere in the bag 12 results in a corresponding loss of atmosphere in the indicator 18, and such loss would be immediately noticeable to the user.

The enclosure 10 as described herein offers several advantages over known purge enclosures, which are usually hard piped to the purge air source, and fixedly connected thereto, thereby eliminating mobility. Also, many existing enclosures are not constructed sufficiently flexible to permit an operator to use a device 16 contained therein, to enable an operator to push the buttons or turn the switches within the enclosure. Thus the present enclosure 10 offers a safe, light, fully portable, inexpensive and versatile enclosure for use in hazardous environments. Such enclosure 10 is particularly suitable for hand calculators, hand-held computers, and digital tachometers typically used in hazardous environments, since the transparent material forming the bag 12 enables the user to readily view the functional features of the device 16 sealed within the protective enclosure 10, yet such enclosure 10 retains sufficient flexibility in its sealed and pressurized state both to retain the protective positive atmosphere sealed therein and to permit a user to operate all of the functional features of the device 16 sealed therein.

Although the primary use of the preferred embodiment of the present invention described above is expected to be in hazardous environments, other applications are possible. Even in a clean room, it may be desirable to environmentally isolate certain equipment used in such a room. For example, it might be desirable to enclose a disk drive gathering data to protect it from the clean room atmosphere, since even trace amounts of dirt could detrimentally affect disk drive performance. While such an application would require a positive atmosphere in the bag 12, the straight through connector 20, a required element for the enclosure 10 in hazardous environments, could be replaced by a suitable valve in another embodiment of the enclosure 10 for clean room applications, where the primary concern is cleanliness and not the hazardous environment outside the enclosure 10.

Having described a preferred embodiment of the present invention, it will be understood that other embodiments may be defined within the description set forth. Accordingly, the appended claims define the limits of the invention.

I claim:

1. A protective, sealable enclosure capable of maintaining an atmosphere therein which is positive relative to the atmosphere outside the enclosure and separate therefrom, said enclosure being formed of a flexible material sufficiently transparent to enable a user to view a manually operable device, when sealed therein, and the functional features associated with such device, the balance between the positive atmosphere within the sealed enclosure and the flexible material forming the enclosure permitting manual operation of the device, while said enclosure retains said positive atmosphere therewithin, said enclosure including a balloon connected to the enclosure so as to have the same positive pressure as the positive pressure of the enclosure, said balloon being inflated to the same positive atmosphere as the atmosphere within the sealed enclosure and thereby being capable of indicating a change in the pressure retained by the enclosure.

2. A protective, sealable enclosure as claimed in claim 1 wherein said enclosure is unanchored and free of any connection to adjacent fixed members with said enclosure.

3. A protective, sealable enclosure with a manually operable device sealed therein, said enclosure being capable of maintaining an atmosphere therein which is positive relative to the atmosphere outside the enclosure and separate therefrom, said enclosure being formed of a flexible material sufficiently transparent to enable a user to view said manually operable device sealed therein and the functional features associated with such device, the balance between the positive atmosphere within the sealed enclosure and the flexible material forming the enclosure permitting manual operation of the device while said enclosure retains said positive atmosphere therewithin, said enclosure including a balloon connected to the enclosure so as to have the same pressure as the positive pressure of the enclosure, said balloon being inflated to the same positive atmosphere as the atmosphere within the sealed enclosure and thereby being capable of indicating a change in the pressure retained by the enclosure.

4. The combination according to claim 3 in which said manually operable device is a self-contained hand-held instrument having a pushbutton keyboard.

* * * * *